United States Patent
Watts

(10) Patent No.: US 6,330,632 B1
(45) Date of Patent: Dec. 11, 2001

(54) SYSTEM FOR ARBITRATING ACCESS FROM MULTIPLE REQUESTORS TO MULTIPLE SHARED RESOURCES OVER A SHARED COMMUNICATIONS LINK AND GIVING PREFERENCE FOR ACCESSING IDLE SHARED RESOURCES

(75) Inventor: Jonathan M. Watts, Folsom, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/163,740

(22) Filed: Sep. 30, 1998

(51) Int. Cl.[7] ..................................................... G06F 13/14
(52) U.S. Cl. .................................... 710/244; 710/240
(58) Field of Search ................................ 709/203, 206, 709/207, 213, 250; 710/40, 240, 241, 242, 243, 244, 107; 395/860; 370/85.2; 711/150; 712/33

(56) References Cited

U.S. PATENT DOCUMENTS

| | | | |
|---|---|---|---|
| 5,392,285 | * 2/1995 | Kurts ........................................ | 370/85 |
| 5,553,071 | * 9/1996 | Aranguren et al. ..................... | 370/85 |
| 5,790,786 | * 8/1998 | Wakeman et al. ..................... | 709/200 |
| 5,832,278 | 11/1998 | Pham ...................................... | 710/243 |
| 5,881,313 | * 3/1999 | Ramakrishnan et al. ............. | 395/860 |
| 5,884,027 | 3/1999 | Garbus et al. ......................... | 709/250 |
| 5,941,967 | * 8/1999 | Zulian ................................... | 710/107 |
| 5,941,979 | 8/1999 | Lentz et al. ............................ | 712/33 |
| 6,154,816 | 11/2000 | Steely et al. .......................... | 711/150 |

* cited by examiner

*Primary Examiner*—Le Hien Luu

(57) ABSTRACT

A method and apparatus for arbitrating for access to a group of shared resources that are communicating with multiple requesters over a shared communications link while minimizing latency and maximizing link utilization is applicable to any situation where more than one device communicates with more than one resource over a single communication link and where the cycle time of the resource is greater than the time the link is needed for the transfer by the resource. The invention maintains information about the state of the shared resources. This allows the provision of an arbitration algorithm that uses the shared communications link more efficiently. A shared resource typically requires some set-up time before transferring its data and also requires some recovery time after its data are transferred before another request may be processed. The invention provides careful selection of the sequence in which requests are serviced which allows one resource to set-up while another resource is still transferring data, and which allows the first resource to complete its recovery while the second resource is transferring data.

29 Claims, 6 Drawing Sheets

SYSTEM FOR ARBITRATING ACCESS FROM MULTIPLE REQUESTORS TO MULTIPLE SHARED RESOURCES OVER A SHARED COMMUNICATIONS LINK AND GIVING PREFERENCE FOR ACCESSING IDLE SHARED RESOURCES

BACKGROUND OF THE INVENTION

1. Technical Field

The invention relates to communications networks. More particularly, the invention relates to a method and apparatus for arbitrating access from multiple requesters to multiple shared resources over a shared communications link.

2. Description of the Prior Art

Arbitration for access to a shared communication link is usually performed with a round robin or priority encoder algorithm. In a typical round robin or priority encoder based arbitration scheme, the choice of which requester is granted access next is made without knowledge of which resource is being accessed. This results in consecutive requests to the same resource. As a result the communication link is idle while the resource completes its post transaction recovery and while it performs its pretransfer setup. This may result in under utilization (loss of efficiency) of the link due to latency in access to the shared resource.

It would be advantageous to provide a method and apparatus for arbitrating access from multiple requestors to multiple shared resources over a shared communications link while minimizing latency and maximizing link utilization.

SUMMARY OF THE INVENTION

The invention provides a method and apparatus for arbitrating for access to a group of shared resources that are communicating with multiple requesters over a shared communications link while minimizing latency and maximizing link utilization. The invention is applicable to any situation where more than one device communicates with more than one resource over a single communication link, and where the cycle time of the resource is greater than the time the link is needed for the transfer by the resource. The invention maintains information about the state of the shared resources. This allows the provision of an arbitration algorithm that uses the shared communications link more efficiently.

A shared resource typically requires some set-up time before transferring its data and also requires some recovery time after its data are transferred before another request may be processed. The invention provides careful selection of the sequence in which requests are serviced which allows one resource to set-up while another resource is still transferring data, and which allows the first resource to complete its recovery while the second resource is transferring data.

BRIEF DESCRIPTION OF THE DRAWINGS

FIG. 2 is a timing diagram showing back-to-back requests to a single resource;

FIG. 3 is a timing diagram showing overlapped back-to-back requests for different resources according to the invention;

DETAILED DESCRIPTION OF THE INVENTION

The invention provides a method and apparatus for arbitrating for access to a group of shared resources that are communicating with multiple requestors over a shared communications link while minimizing latency and maximizing link utilization. A shared resource typically 30 requires some set-up time before transferring its data and also requires some recovery time after its data are transferred before another request may be processed. The invention provides careful selection of the sequence in which requests are serviced which allows one resource to set-up while another resource is still transferring data, and which allows the first resource to complete its recovery while the second resource is transferring data.

Figure 1:
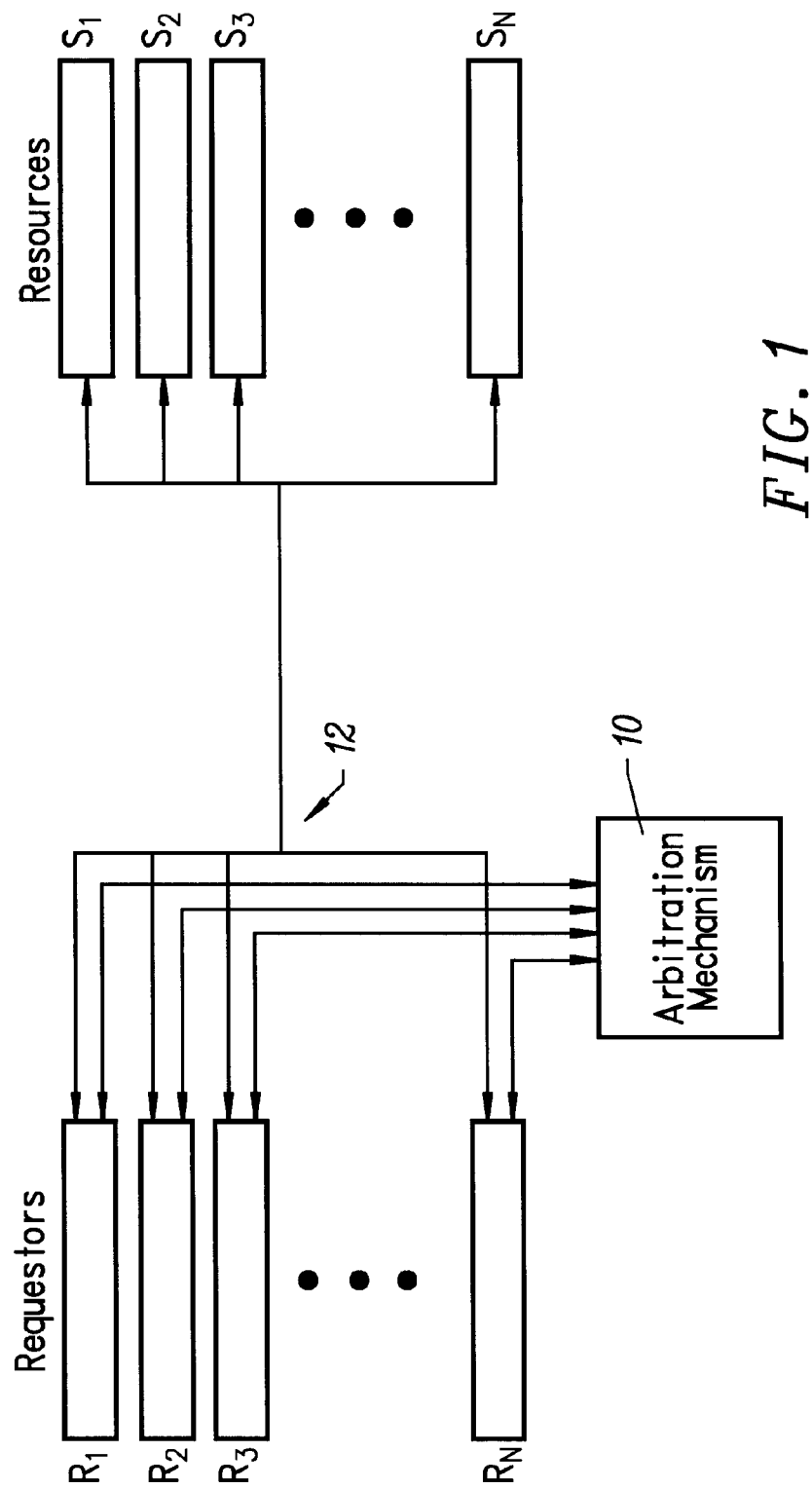
FIG. 1 is a block schematic diagram showing a system in which an arbitration mechanism is provided to arbitrate for access to a group of shared resources which are communicating with multiple requesters over a shared communications link according to the invention.

FIG. 1 is a block schematic diagram showing a system in 10 which an arbitration mechanism is provided to arbitrate for access to a group of shared resources S1, S2, S3, and Sn which are communicating with multiple requesters R1, R2, R3, and Rn over a shared communications link 12. The invention is applicable to any situation where more than one device communicates with more than one resource over a single communication link, and where the cycle time of the resource is greater than the time the link is needed for the transfer by the resource. The invention maintains information about the state of the shared resources. This allows the provision of an arbitration algorithm 10 that uses the shared communications link more efficiently.

Figures 2, 3:
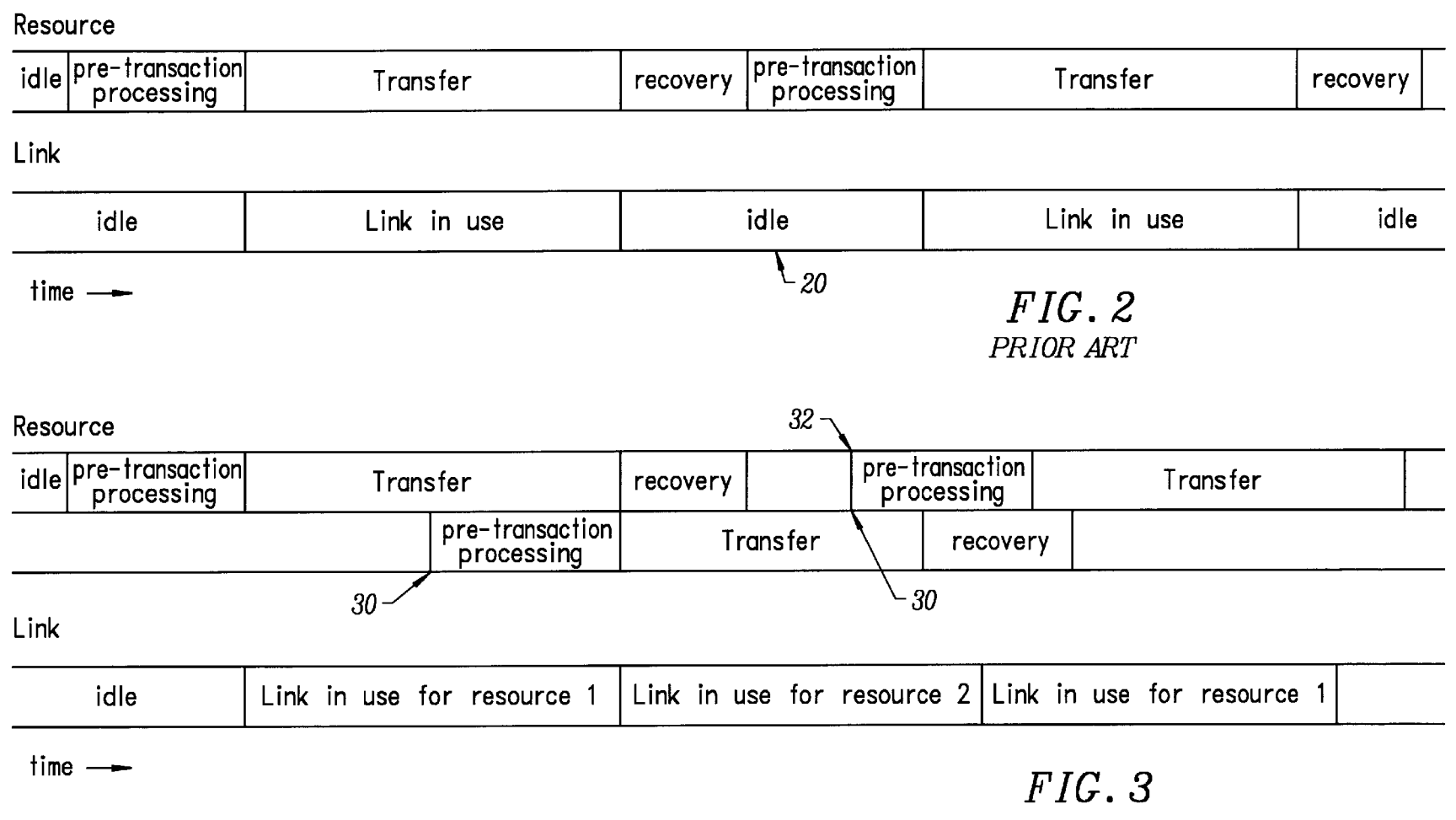

FIG. 2 is a timing diagram showing back-to-back requests to a single resource. In a typical round robin or priority encoder based arbitration scheme the choice of which requestor is granted access next is made without knowledge of which resource is being accessed. This results in consecutive requests to the same resource. As a result, the communication link is idle during the interval 20 that the resource completes its post-transaction recovery and while it performs its pre-transfer setup.

FIG. 3 is a timing diagram showing overlapped back-to5 back requests for different resources according to the invention. By analyzing the resource to which the requests are directed, requestors which are attempting to access idle resources can be given preference over those that are requesting resources that are busy. Also, the arbitration decision 30 can be advanced in time 32 by the amount of time required by the resource to perform its pre-transfer setup. This allows the setup and recovery time for one resource to be hidden behind a transfer being performed for another resource.

To take advantage of this, the invention assigns to each request a priority that is based on the state of the resource the requestor is attempting to access. In the simplest case, as shown in FIG. 3, a two level priority is sufficient. When granting the next access, only those requests that have been assigned a high priority (the resource they are requesting is free) are examined and a conventional round robin or priority encoder type arbitration applied among them (as dictated by the needs of the specific application). If no requests have been assigned a high priority, then the round robin or priority scheme is used among the lower priority requests.

If the sum of the recovery and pre-transaction processing times is greater than the transfer time, additional benefit can be gained by assigning more than two levels of priority. For instance requests to the most recently accessed resource might be assigned a low priority, requests to a resource accessed immediately before that a medium priority, and requests to any other resource a high priority. The requests are then handled by the assigned priority and either round robin or priority encoding within each assigned priority level.

Figure 4:
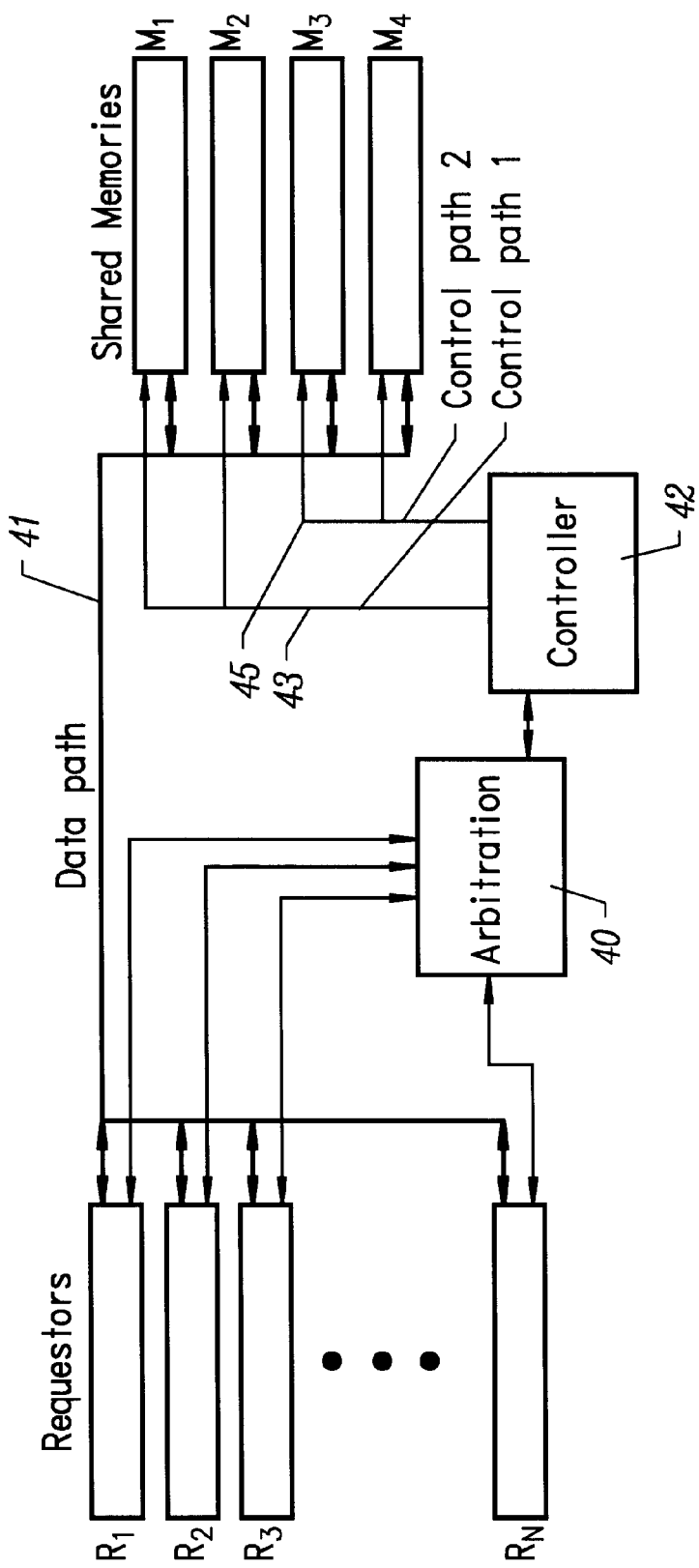
FIG. 4 is a block schematic diagram showing a system having multiple requestors and four memory banks where all elements of the system share a common data path and where the memories are split into two groups, each group sharing a common control path according to the invention.

Another case which may benefit from the use of more than two priority levels is when there is more than one shared link. FIG. 4 is a block schematic diagram showing a system having multiple requesters R1, R2, R3, and Rn and four memory banks M1, M2, M3, and M4 where all elements of the system share a common data path 41 and where the memories are split into two groups, each group sharing a common control path 43, 45 by which the memories are controlled via a controller 42. In this example, if both the requested resource (i.e. memory) and the control path for the request are free, a high priority is assigned by the arbitration mechanism 40; if the resource is free but the control path is being used, a medium priority is assigned; and if the resource is busy, a low priority is assigned. Optimization of the priority assignments is dependent on the specifics of the control and timing of the particular resources being shared.

The case where the second level of arbitration is also a priority encoder allows some additional flexibility. It is possible to trade-off adherence to the desired priority of the requestors versus optimization of access because the two portions of the arbitration can be collapsed into a single, larger priority encoder.

As an example, suppose the system above has three requestors (R1 R2, R3), which should be prioritized in that order by system needs, and three priority levels are being used to optimize the ordering of access (eg. Hhigh, M-medium, and L-low). When the two levels of arbitration are collapsed, there are nine types of requests. These requests are designated by concatenating the requester and the priority (e.g. R1 H—requester R1, high priority; R3L—requestor 3, low priority). Table "A" below shows several possible trade-offs between adherence to the system level request priorities and maximal optimization.

TABLE A

Priority vs. Various Levels of Optimization

| Priority | Strict Adherence To System Priority (No Optimization) | Partial Optimization | Maximum Optimization |
|---|---|---|---|
| 1 | R1H | R1H | R1H |
| 2 | R1M | R2H | R2H |
| 3 | R1L | R1M | R3H |
| 4 | R2H | R3H | R1M |
| 5 | R2M | R2M | R2M |
| 6 | R2L | R1L | R3M |
| 7 | R3H | R3M | R1L |
| 8 | R3M | R2L | R2L |
| 9 | R3L | R3L | R3L |

An important consequence of the trade-offs selected is that when a request is not granted because another request was given a higher priority, that request has a higher priority in the following arbitration cycle. For example, suppose e partial optimization column in Table "A" is used and further suppose that requests are pending for requesters R1 and R3. The request from R1 has been given a low priority (R1L) because the previous request was for the same resource. The request for R3 has been given a high priority (R3H) because the resource requested is idle. The cycle is granted to R3H based on the priority table. On the next arbitration cycle, the request from R1 is still pending. Because the resource requested is no longer the most recently accessed and the control bus is idle (because the granted request was high priority, it was for a resource on the other control bus), the request from R1 is now assigned a high priority (R1H) insuring that it is handled next. This behavior can be used to bound the amount of additional delay a requestor incurs as a result of the optimization for request ordering.

Figure 5:
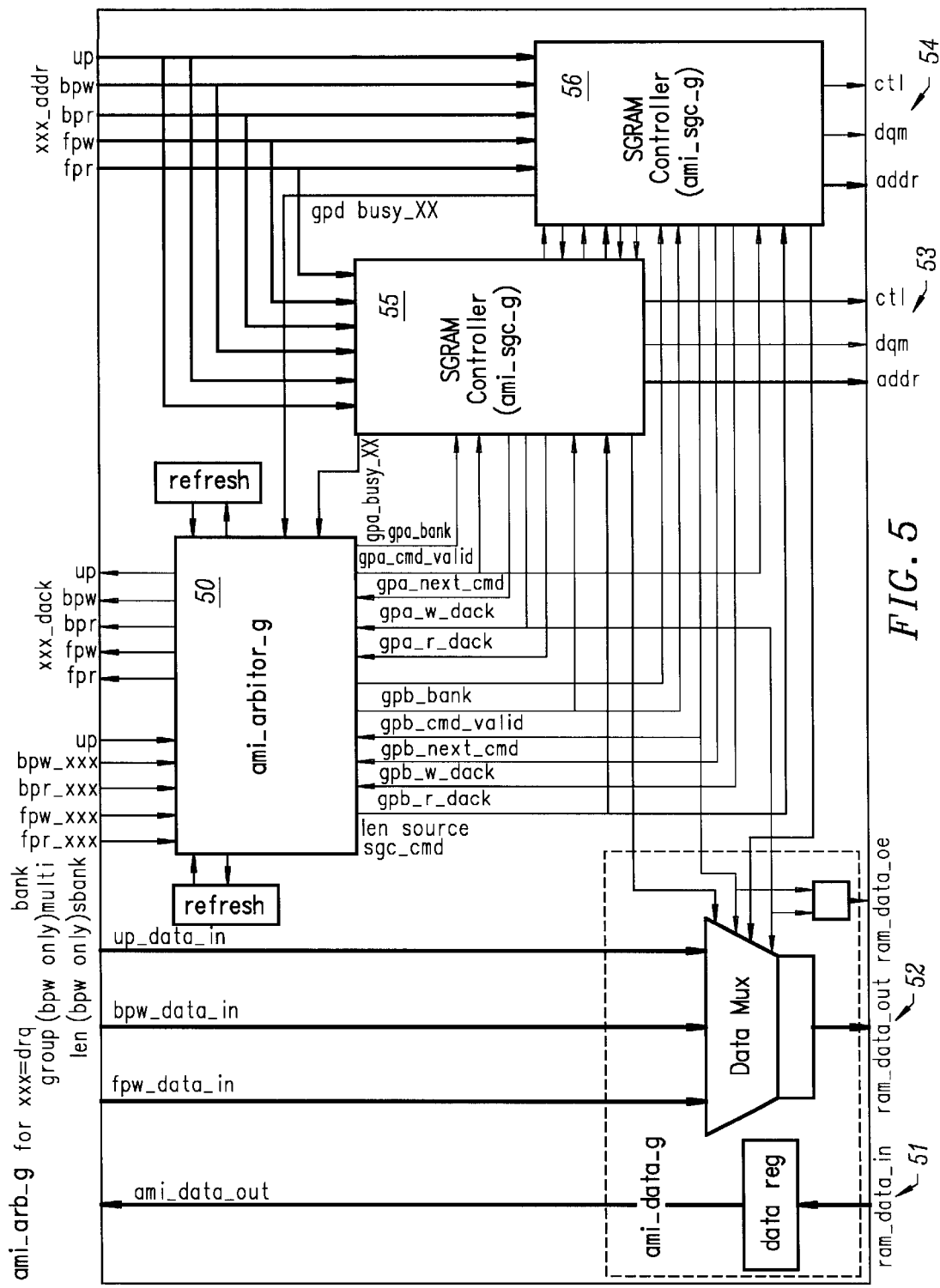
FIG. 5 is a block schematic diagram showing a system that accepts requests from three devices for reads and three devices for writes according to the invention.

The presently preferred embodiment of the invention is typically more complicated than the basic case described above. FIG. 5 is a block schematic diagram showing a system that accepts requests from three devices for reads and three devices for writes according to the invention.

The presently preferred embodiment of the invention is implemented in an arbitor module 50.

In the preferred embodiment of the invention, the shared resource consists of a plurality of memory banks that are located in external memory chips. The memory chips each have two internal banks of memory. Four chips are configured to provide a total of four memory banks having twice the word width that the chips normally provide. The shared communications link in a first instance is the data bus 51, 52 that connects the memory chips to the arbitration system of the invention; the shared communications link in a second instance is the control bus 53, 54 that is used to control the memory chips via two memory controllers 55, 56. There is s separate control bus for each group, such that the control bus is only shared among two banks instead of four banks.

In the preferred embodiment of the invention, there are five requesters, referred to as: frontplane reader (FPR), frontplane writer (FPW), backplane reader (BPR), backplane writer (BPW), and microprocessor reader/writer (UP). FPR and BPR can only perform read operations, FPW and BPW can only perform write operations, and UP can perform either read or write operations.

Figure 6:
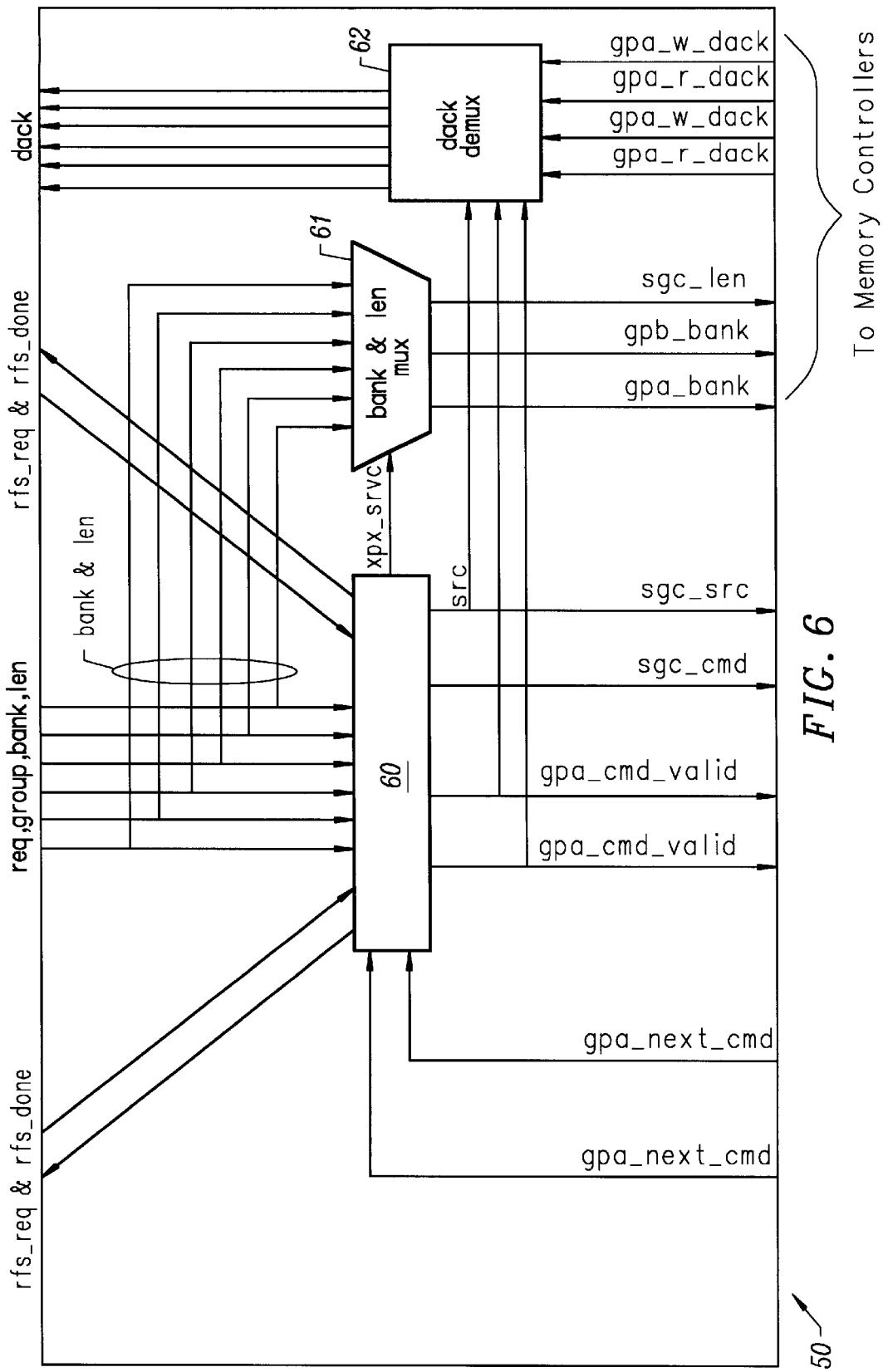
FIG. 6 is a block schematic diagram showing multiplexing and demultiplexing logic and an arbitration function according to the invention.

FIG. 6 is a block schematic diagram showing multiplexing and demultiplexing logic and an arbitration function according to the invention. The arbitor module 50 includes multiplexing logic 61 and demultiplexing logic 62 which allows the exchange of data with the memory controllers (see FIG. 5). The arbitration function, which is a key element of the invention, is implemented in an arbitor element 60. The arbitor element implements an arbitration algorithm (described in greater detail below).

The arbitration algorithm makes a determination of which memory requestor should be serviced next. In the presently preferred embodiment of the invention, there are three factors on which this decision is based, i.e. the priority of the source, the activity of the bank to which the source is directed, and the direction (read/write) relative to the current direction.

The source priorities are as follows:

Frontplane reader/writer (FPR/FPW);

Backplane reader/writer (BPR/BPW); and

Microprocessor reader/writer (UP).

The activity of the bank to which the request is directed is measured by assigning each request a type as follows:

HI—the bank to which this request is directed is in an idle group;

MED—the requested bank(s) is/are not active but the other bank in the same group is active;

LO—a request is pending, but it is directed to a bank(s) that is/are not ready to accept a request; and NONE—no request is pending.

The direction priority is as follows:

Same direction as the last request; and

Opposite direction as the last request.

The direction may be used as a tie breaker in determining priority between requests of otherwise equal priority (e.g. FPR/FPW and BPR/BPW) are always of different directions, i.e. read or write.

In the preferred embodiment of the invention, BP requests of type HI are allowed to jump ahead of FP requests of type LO to improve cycle packing efficiency. When a HI BP request is serviced, it causes the FP request to become HI because the BP HI request causes the bank requested by the FP to become idle.

Figure 7:
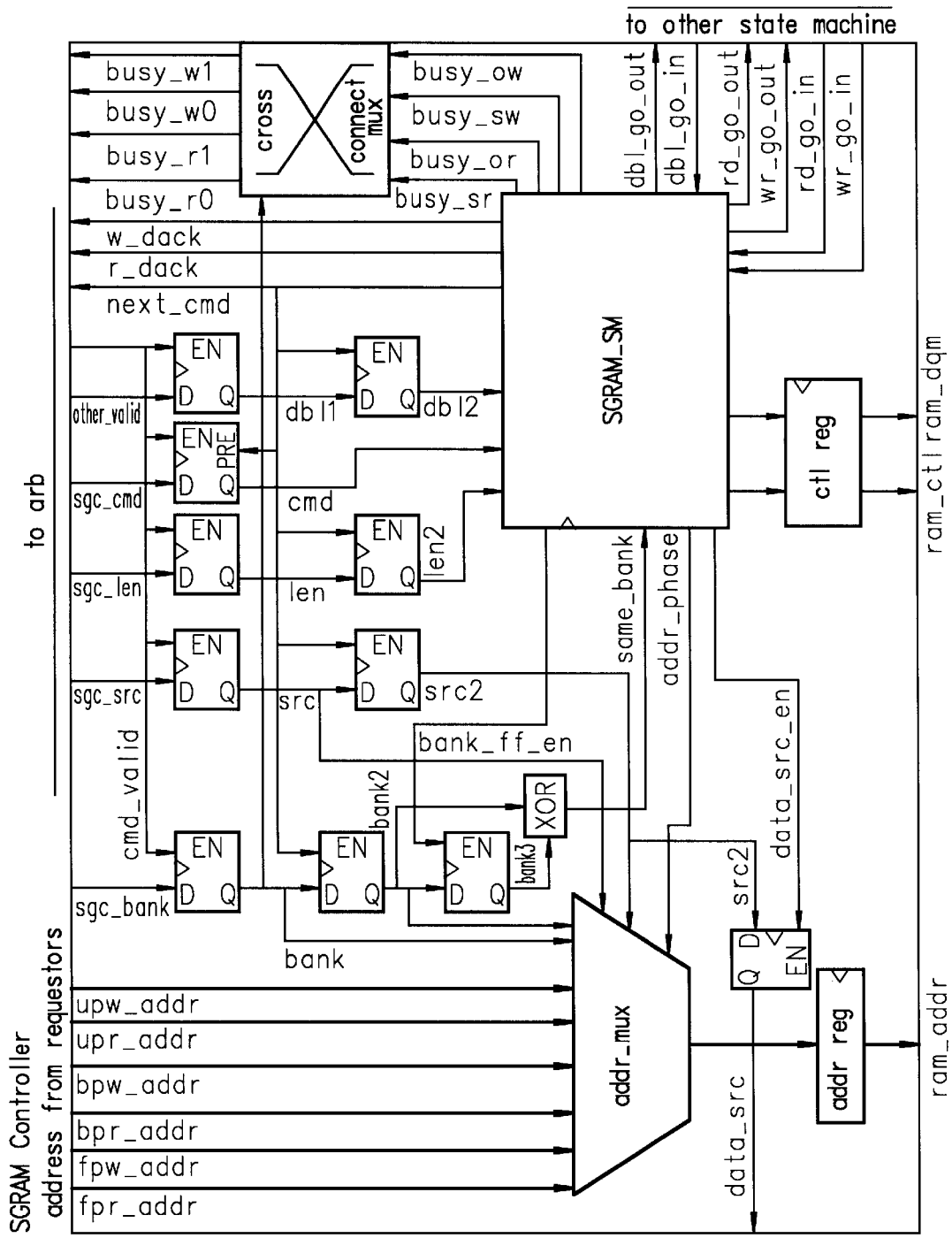
FIG. 7 is a block schematic diagram showing a memory 20 controller.

FIG. 7 is a block schematic diagram showing a memory controller 55, 56. FIG. 7 is provided for sake of completeness. It will be appreciated by those skilled in the art that the actual memory controller used to implement the invention is a matter of choice, and is readily selected by those skilled in the art from any number of memory controller elements that are known in the art.

Table "B" below is a source code listing of an arbitor element according to the presently preferred embodiment of the invention.

Note: The source code listing of Table B is copyrighted and may only be reproduced and used as part of, and in connection with, the proper use and reproduction of this document as a patent application, and only if and when such document becomes publicly available, and in connection with the proper use and repoduction of any patent that may issue from this application, and for no other purpose whatsoever.

The source code listing of Table B can be found on a CD Appendix.

What is claimed is:

1. A method for arbitrating for access to a group of shared resources that are communicating with multiple requesters over a shared communications link, comprising the steps of:

selecting a sequence in which requests from said multiple requestors are serviced by said shared resources, wherein said sequence comprises:

allowing one resource to set-up while another resource is still transferring data;

allowing a first resource to complete its recovery while a second resource is transferring data;

analyzing a resource of said shared resources to which said requests are directed; and giving preference to some of said multiple requestors which are attempting to access idle resources over those that are requesting said shared resources that are busy.

2. The method of claim 1, further comprising the step of:

providing an arbitration mechanism to arbitrate for access to said group of shared resources which are communicating with said multiple requestors over said shared communications link.

3. The method of claim 1, wherein more than one device communicates with more than one resource over a single communication link; and wherein the cycle time of said resource is greater than the time said link is needed for the transfer by said resource.

4. The method of claim 1, further comprising the step of:

maintaining information about the state of said shared resources.

5. The method of claim 1, further comprising the step of:

advancing an arbitration decision in time by an amount of time required by a resource to perform a pre-transfer setup;

wherein setup and recovery time for one resource is hidden behind a transfer being performed for another resource.

6. The method of claim 1, further comprising the step of:

assigning to each request a priority that is based on the state of a resource that a requestor is attempting to access.

7. The method of claim 6, further comprising the step of:

providing a two level priority;

wherein when granting a next access, only those requests that have been assigned a high priority are examined, and a conventional round robin or priority encoder type arbitration is applied among them; and wherein if no requests have been assigned a high priority, then a round robin or priority scheme is used among lower priority requests.

8. The method of claim 7, further comprising the step of:

assigning more than two levels of priority.

9. The method of claim 8, wherein requests to a most recently accessed resource are assigned a low priority, requests to a resource accessed immediately before that are assigned a medium priority, and requests to any other resource are assigned a high priority; and wherein requests are then handled by an assigned priority and either round robin or priority encoding within each assigned priority level.

10. The method of claim 1, wherein there is more than one shared link.

11. The method of claim 7, wherein a second level of arbitration is also a priority encoder.

12. The method of claim 7, wherein a request has a higher priority in a following arbitration cycle when said request is not granted in a first arbitration cycle.

13. An apparatus for arbitrating for access to a group of shared resources that are communicating with multiple requesters over a shared communications link, comprising:

an arbitrator module for selecting a sequence in which requests from said multiple requestors are serviced by said shared resources; wherein said arbitrator module allows one resource to setup while another resource is still transferring data; and wherein said arbitrator module allows a first resource to complete its recovery while a second resource is transferring data;

a module for analyzing a resource of said shared resources to which said requests are directed; and a module for giving preference to some of said multiple requestors which are attempting to access idle resources over those that are requesting said shared resources that are busy.

14. The apparatus of claim 13, said arbitor module further comprising:
an arbitration mechanism to arbitrate for access to said group of shared resources which are communicating with said multiple requestors over said shared communications link.

15. The apparatus of claim 13, wherein more than one device communicates with more than one resource over a single communication link; and
wherein the cycle time of said resource is greater than the time said link is needed for the transfer by said resource.

16. The apparatus of claim 13, further comprising:
a module for maintaining information about the state of said shared resources.

17. The apparatus of claim 13, further comprising:
a module for advancing an arbitration decision in time by an amount of time required by a resource to perform a pretransfer setup;
wherein setup and recovery time for one resource is hidden behind a transfer being performed for another resource.

18. The apparatus of claim 13, further comprising: a module for assigning to each request a priority that is based on the state of a resource that a requestor is attempting to access.

19. The apparatus of claim 18, further comprising:
a module for providing a two level priority;
wherein when granting a next access, only those requests that have been assigned a high priority are examined, and a conventional round robin or priority encoder type arbitration is applied among them; and
wherein if no requests have been assigned a high priority, then a round robin or priority scheme is used among lower priority requests.

20. The apparatus of claim 19, further comprising: a module for assigning more than two levels of priority.

21. The apparatus of claim 20, wherein requests to a most recently accessed resource are assigned a low priority, requests to a resource accessed immediately before that are assigned a medium priority, and requests to any other resource are assigned a high priority; and
wherein requests are then handled by an assigned priority and either round robin or priority encoding within each assigned priority level.

22. The apparatus of claim 13, wherein there is more than one shared link.

23. The apparatus of claim 18, wherein a second level of arbitration is also a priority encoder.

24. The apparatus of claim 18, wherein a request has a higher priority in a following arbitration cycle when said request is not granted in a first arbitration cycle because another request was given a higher priority.

25. The apparatus of claim 13, said arbitor module further comprising:
multiplexing logic; and demultiplexing logic;
wherein said multiplexing logic and demultiplexing logic allow exchange of data with one or more memory requestors.

26. The apparatus of claim 13, said arbitor module making a determination of which requester should be serviced next;
wherein this decision is based on the priority of a source, the activity of a resource to which said source is directed, and the read/write direction relative to a current direction.

27. The apparatus of claim 13, wherein a resource to which a request is directed is measured by assigning each request a type as follows:
HI—a resource to which a request is directed is in an idle group;
MED—a requested resource is not active but another resource in a same group is active;
LO—a request is pending, but it is directed to a resource that is/are not ready to accept a request; and
NONE—no request is pending.

28. The apparatus of claim 13, wherein direction priority is as follows: same direction as a last request; and opposite direction as a last request.

29. The apparatus of claim 28, wherein direction is used as a tie breaker in determining priority between requests of otherwise equal priority.

* * * * *